United States Patent
Araujo et al.

(10) Patent No.: US 11,775,638 B2
(45) Date of Patent: Oct. 3, 2023

(54) IDENTIFICATION AND EXTRACTION OF KEY FORENSICS INDICATORS OF COMPROMISE USING SUBJECT-SPECIFIC FILESYSTEM VIEWS

(71) Applicant: International Business Machines Corporation, Armonk, NY (US)

(72) Inventors: Frederico Araujo, White Plains, NY (US); Anne E. Kohlbrenner, Pittsburgh, PA (US); Marc Philippe Stoecklin, White Plains, NY (US); Teryl Paul Taylor, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1092 days.

(21) Appl. No.: 16/019,761

(22) Filed: Jun. 27, 2018

(65) Prior Publication Data
US 2020/0004962 A1  Jan. 2, 2020

(51) Int. Cl.
*G06F 21/56* (2013.01)
*G06F 16/18* (2019.01)
*G06F 16/17* (2019.01)

(52) U.S. Cl.
CPC ........ *G06F 21/565* (2013.01); *G06F 16/1734* (2019.01); *G06F 16/18* (2019.01); *G06F 21/568* (2013.01)

(58) Field of Classification Search
CPC .... G06F 21/565; G06F 16/18; G06F 16/1734; G06F 21/568
See application file for complete search history.

(56) References Cited

U.S. PATENT DOCUMENTS

| | | | |
|---|---|---|---|
| 7,197,516 B1 * | 3/2007 | Hipp | G06F 16/10 |
| 10,558,818 B2 * | 2/2020 | Goyal | G06F 21/6227 |

(Continued)

FOREIGN PATENT DOCUMENTS

CN    107330322 A    11/2017

OTHER PUBLICATIONS

Kharraz, et al, "UNVEIL: A Large-Scale, Automated Approach to Detecting Ransomware," 25th USENIX Security Symposium, Aug. 2016.

(Continued)

*Primary Examiner* — Paul E Callahan
(74) *Attorney, Agent, or Firm* — Anthony Pallone; David H. Judson

(57) ABSTRACT

A stackable filesystem that transparently tracks process file writes for forensic analysis. The filesystem comprises a base filesystem, and an overlay filesystem. Processes see the union of the upper and lower filesystems, but process writes are only reflected in the overlay. By providing per-process views of the filesystem using this stackable approach, a forensic analyzer can record a process's file-based activity—i.e., file creation, deletion, modification. These activities are then analyzed to identify indicators of compromise (IoCs). These indicators are then fed into a forensics analysis engine, which then quickly decides whether a subject (e.g., process, user) is malicious. If so, the system takes some proactive action to alert a proper authority, to quarantine the potential attack, or to provide other remediation. The approach enables forensic analysis without requiring file access mediation, or conducting system event-level collection and analysis, making it a lightweight, and non-intrusive solution.

21 Claims, 7 Drawing Sheets

(56) References Cited

U.S. PATENT DOCUMENTS

| | | |
|---|---|---|
| 10,725,752 B1 * | 7/2020 | Wagner .................. G06F 8/433 |
| 2005/0246770 A1 | 11/2005 | Hunt et al. |
| 2005/0273858 A1 | 12/2005 | Zadok et al. |
| 2009/0030935 A1 | 1/2009 | Kurichiyath et al. |
| 2009/0043823 A1 | 2/2009 | Iftode et al. |
| 2015/0237124 A1 | 8/2015 | Balachandran et al. |
| 2016/0342804 A1 | 11/2016 | Reddy et al. |
| 2018/0069707 A1 | 3/2018 | Loreskar et al. |
| 2020/0269175 A1 | 8/2020 | Yang |

OTHER PUBLICATIONS

Scaife, et al, "Cryptolock (and drop it): Stopping ransomware attacks on user data," 2016 IEEE 36th International Conference on Distributed Computing Systems, 2016.
Kolodenker, et al, "Paybreak: Defense against cryptographic ransomware," Proceedings ACM Sym. Information, Computer and Communications Security, 2017.
Linux Programmer's Manual: Namespaces, http://man7.org/linux/man-pages/man7/namespaces.7.html, 2017.
Continella, et al, "Shieldfs: A self-healing, ransomware-aware filesystem," ACSAC '16, Dec. 2016.
Kharraz, et al, "Redemption: Real-time protection against ransomware at end-hosts,".
Rutkowska, et al, Qubes os architecture v0.3, 2010.
Office action, CN201910551713.X, dated Sep. 22, 2022.

* cited by examiner

Table 1: Indicators of compromise (IoC) for forensic analysis of Linux malware

| IoC | Forensic Features | Malware | Malware MD5/Reference |
|---|---|---|---|
| Unprivileged Persistence | .bash_profile<br>.profile<br>.bashrc | Umbreon<br>FakeFile | f9ba2429eae5471acde820102c5b8159<br>ec301904171b1ebde3a57c952ae58a3a |
| Privileged Persistence | /etc/re.local<br>/etc/inil.d<br>/etc/rc[0-6].d | XOR.DDOS<br>Trojan.Linux.Rootkit.SU<br>Linux/DDoS-Flood.B | 4fdf96368eff70f6dd99bbaa4e30e78c<br>b760b16916edb59b9008cb4900498ad9<br>03afa3dbd7f1cefdb897ebb05db61e6f |
| Account Manipulation | /etc/shadow<br>/etc/passwd | Umbreon | f9ba2429eae5471acde820102c5b8159 |
| Scheduled Task | /etc/crontab<br>/etc/cron.d/<br>/etc/cron.daily<br>/etc/cron. weekly ... | Trojan.Linux.Rootkit.SU<br>Umbreon | b760b16916edb59b9008cb4900498ad9<br>f9ba2429eae5471acde820102c5b8159 |
| Library Injection | /etc/ld.so.preload | Jynx2<br>Umbreon | c45c761a3482f2a9514aa851dd8fc7b8<br>f9ba2429eae5471acde820102c5b8159 |
| Binary Drop | ELF file download | TrojanDownloader<br>XOR.DDOS<br>Linux/DDoS-Flood.B | 78fae3e208de3bbadabe09f4996f0b44<br>4fdf96368eff70f6dd99bbaa4e30e78c<br>03afa3dbd7f1cefdb897ebb05db61e6f |
| Binary Modifications and Deletions | ELF rewriting | Troj/FKit-A<br>Liora<br>Linux.Zariche<br>py elf prepender | 9dba0f36dld8d8c684579c5e80700337 |
| Hidden Evidence | . bash..history<br>hidden files<br>delete crontabs | Jynx2<br>Umbreon | c45c761a3482f2a9514aa851dd8fc7b8<br>f9ba2429eae5471acde820102c5b8159 |
| File Defacement | encrypted files | Erebus<br>KillDisk | 27d857e12b9be5d43f935b8cc86eaabf<br>b9748ec5a7a0e3bc3ca139083ca875b0 |
| Information Measurement | binary differences<br>information gain<br>write entropy | Erebus<br>KillDisk | 27d857eI2b9be5d43f935b8cc86caabf<br>b9748ec5a7a0e3bc3ca139083ca875b0 |

FIG. 9

IDENTIFICATION AND EXTRACTION OF KEY FORENSICS INDICATORS OF COMPROMISE USING SUBJECT-SPECIFIC FILESYSTEM VIEWS

BACKGROUND

Technical Field

This disclosure relates generally to cyber security.

Background of the Related Art

In today's modern digital age, the compromise or theft of data can have severe consequences on individuals, governments, enterprises, and cloud environments. Capitalizing on data as the new digital currency, cybercrime has become a big money business, with criminals stealing millions of credit card numbers and holding data ransom, costing businesses millions of dollars to regain access to their data. In face of the alarming rate and scope of recent attacks, new approaches are needed to effectively identify and dissuade attackers trying to steal or destroy their targets' crown jewels.

Existing approaches to prevent data theft only work under special circumstances. For example, current ransomware protections focus on preventing malware from running, maintaining backups, or trying to reverse engineer custom cryptography schemes. Unfortunately, such reactive approaches have been proven inadequate, as nearly two-thirds of companies attacked by ransomware still have their files successfully encrypted, with less than half being able to recover from backups.

Once malware has infected a computer system, it quickly establishes a foothold to persist across reboots. Furthermore, malware hides from system users and anti-virus software by blending into the system, covering its tracks, and masking its presence. Many of the techniques that malware uses to persist and hide within a system leave forensic markers on the filesystem that can be analyzed to identify the malware, and to learn about its activities. That said, techniques to extract such information requires file access mediation, or conducting system event-level collection and analysis, which is computationally-inefficient and intrusive.

BRIEF SUMMARY

A stackable filesystem that transparently tracks process file writes for forensic analysis. The filesystem comprises a base filesystem, and an overlay filesystem. Processes see the union of the upper and lower filesystems, but process writes are only reflected in the overlay. By providing per-process views of the filesystem using this stackable approach, a forensic analyzer can record a process's file-based activity, e.g., file creation, deletion, modification, and so forth. These activities are then analyzed to identify indicators of compromise (IoCs). These indicators are then fed into a forensics analysis engine, which decides whether a subject (e.g., process, user) is malicious. If the system determines the subject is malicious, the system takes some proactive action, e.g., alerting a proper authority, quarantining the potential attack, or providing other mitigation or remediation. The approach enables forensic analysis without requiring file access mediation or conducting system event-level collection and analysis, making it a lightweight and non-intrusive solution.

The foregoing has outlined some of the more pertinent features of the subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which:

FIG. 9 depicts various IoCs for forensic analysis of Linux operating system malware.

DETAILED DESCRIPTION OF AN ILLUSTRATIVE EMBODIMENT

Figure 1:
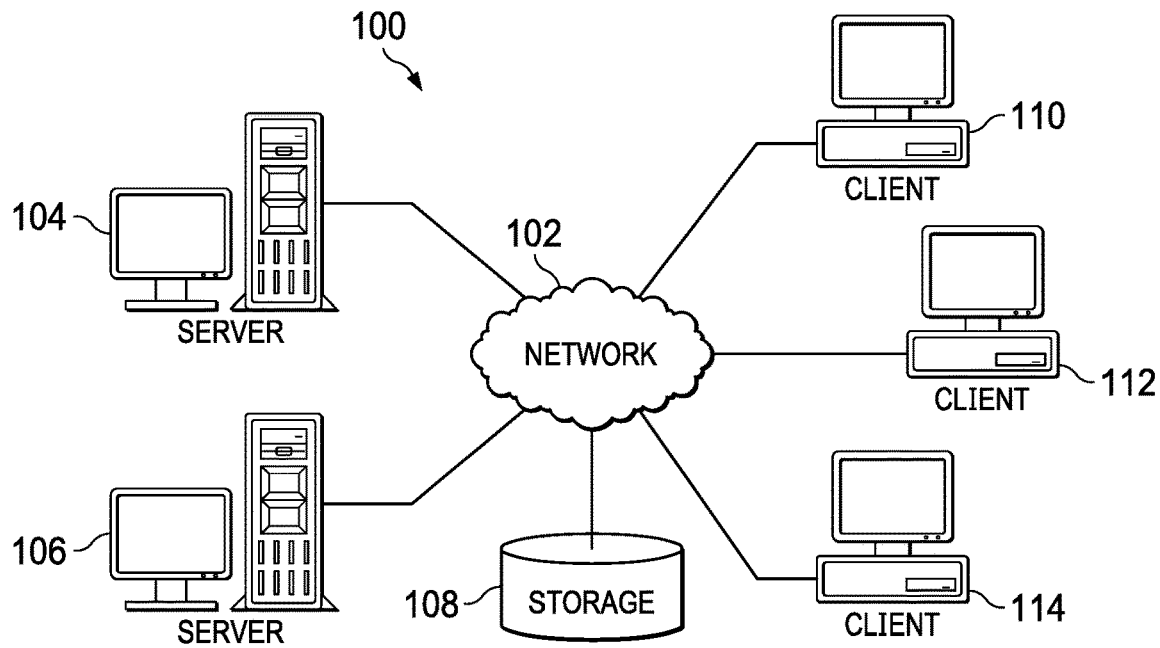
FIG. 1 depicts an exemplary block diagram of a distributed data processing environment in which exemplary aspects of the illustrative embodiments may be implemented.
Figure 2:
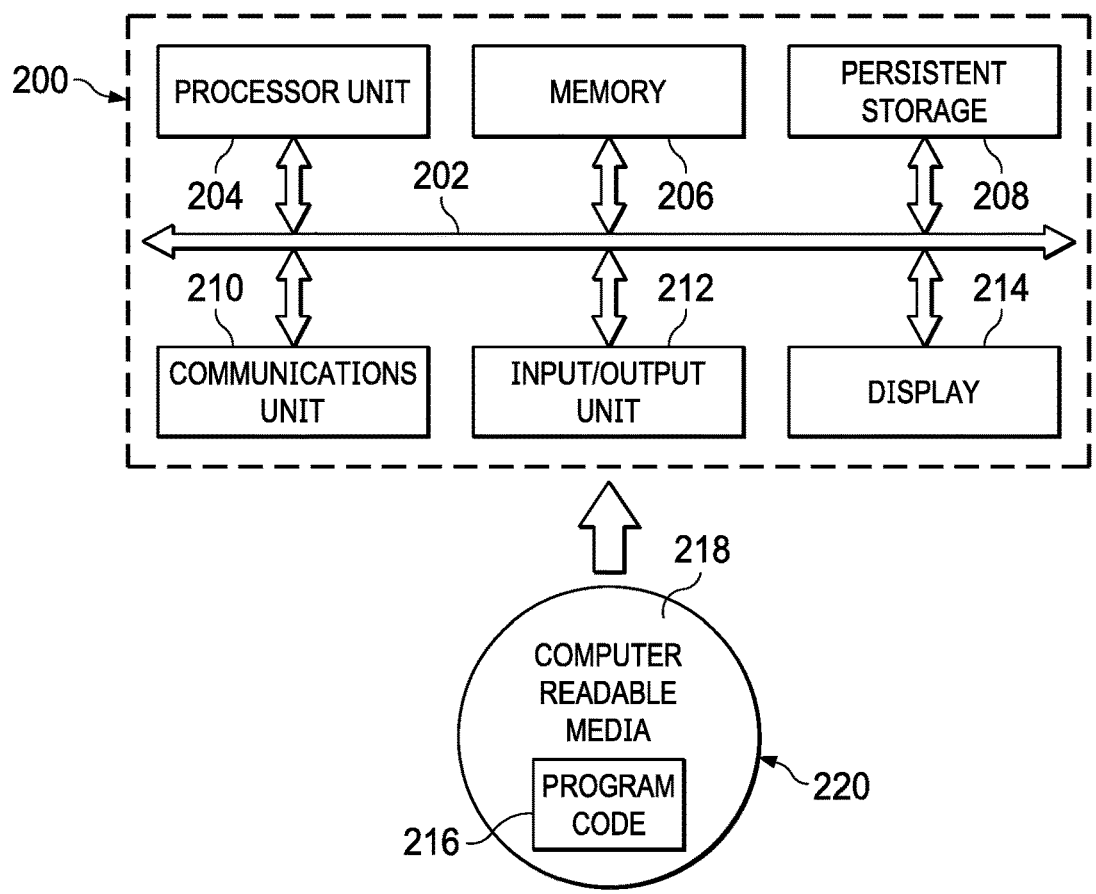
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the disclosed subject matter.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of an exemplary data processing system is shown in which aspects of the illustrative embodiments may be implemented. Data processing system 200 is an example of a computer, such as client 110 in FIG. 1, in which computer usable code or instructions implementing the processes for illustrative embodiments of the disclosure may be located.

"With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214."

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 206 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 206 may take various forms depending on the particular implementation. For example, persistent storage 206 may contain one or more components or devices. For example, persistent storage 206 may be a hard drive, a flash memory, a rewritable optical disk, a rewritable magnetic tape, or some combination of the above. The media used by persistent storage 206 also may be removable. For example, a removable hard drive may be used for persistent storage 206.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 206. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 206.

Program code 216 is located in a functional form on computer-readable media 216 that is selectively removable and may be loaded onto or transferred to data processing system 200 for execution by processor unit 204. Program code 216 and computer-readable media 216 form computer program product 220 in these examples. In one example, computer-readable media 216 may be in a tangible form, such as, for example, an optical or magnetic disc that is inserted or placed into a drive or other device that is part of persistent storage 206 for transfer onto a storage device, such as a hard drive that is part of persistent storage 206. In a tangible form, computer-readable media 216 also may take the form of a persistent storage, such as a hard drive, a thumb drive, or a flash memory that is connected to data processing system 200. The tangible form of computer-readable media 216 is also referred to as computer-recordable storage media. In some instances, computer-recordable media 216 may not be removable.

Alternatively, program code 216 may be transferred to data processing system 200 from computer-readable media 216 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 206, and computer-readable media 216 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF).

By way of additional background, it is known that modern operating systems (including, without limitation, Linux) implement a feature known as "namespaces." A namespace isolates and virtualizes system resources for a collection of processes. In particular, namespaces are a kernel-level feature that wraps a global system resource into an abstraction, such that the process inside the namespace appears to have its own isolated instance of the global system resource. Processes inside a namespace are visible to others inside the same namespace, but they are opaque to processes outside the namespace. The Linux OS kernel provides seven (7) namespaces, each providing isolation for a different operating resource. Some examples of resources that can be virtualized include process IDs, hostnames, user IDs, and the like. One namespace, called cgroup, refers to the Linux kernel functionality called cgroups that allows limitation and prioritization of resources (CPU, memory, block I/O, network, etc.). Another namespace, called mount, refers to the filesystem mount points seen by a process.

It is also known to provide so-called "container" technology that combines the operating system kernel's support of cgroups and namespaces to provide isolated execution environments for applications. Thus, for example, where a host machine executes an operating system (OS), such as the Linux kernel, the operating system provides an OS-level virtualization method for running multiple isolated computing workloads (containers). Typically, a container in this environment hosts one or more applications. By providing a way to create and enter containers, the operating system gives applications the illusion of running on a separate machine while at the same time sharing many of the underlying resources.

Integrity, Theft Protection and Cyber Deception Using a Deception-Based Filesystem During a successful cyberattack, an adversary typically installs an application on the defender's system and/or exfiltrates private information. Both of these actions involve interactions with the exploited computer's filesystem. Attackers typically do not know the layout of such filesystems; therefore, they must investigate the various files on the system to identify interesting data to remove. The approach now described is designed to leverage this need by the attacker (to investigate files) to thereby detect malicious behavior and identify intruders. To this end, an existing base filesystem is augmented to transparently create one or more levels of stacking to protect the base filesystem and, in particular, by injecting decoy files, monitoring file accesses, and providing per-process views of the filesystem to confuse and identify potential attackers. This stacking provides a decoy filesystem that protects the underlying files in the base filesystem by hiding and redacting of sensitive files with baits, injecting decoys onto fake system "views" that are purveyed to untrusted subjects, and file access monitoring. This cyber deception is carried out while maintaining a pristine state of the filesystem with respect to legitimate processes.

Thus, instead of an approach that merely encouraging attackers to reveal themselves (e.g., by interacting with the filesystem), the technique described below preferably embeds monitoring, decoy files creation, and file systems views separation directly into the filesystem rather than externally or through the files themselves. The resulting stackable filesystem significantly curtails data theft and ensures file integrity protection.

Figure 3:
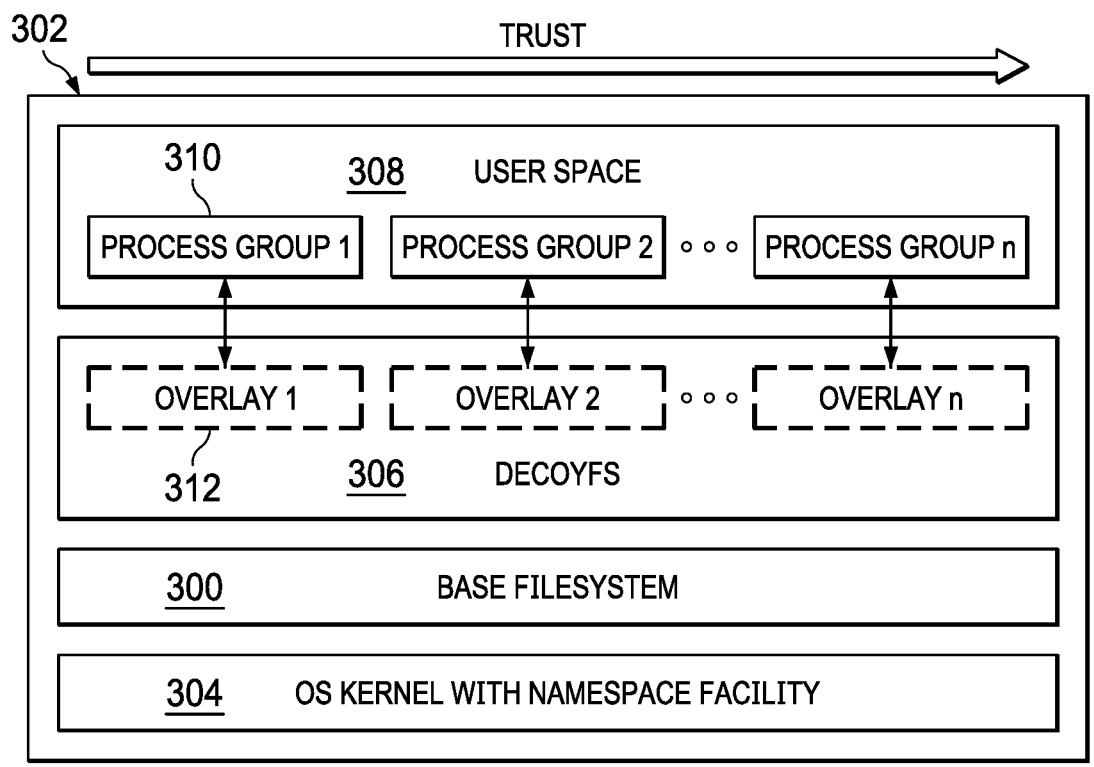
FIG. 3 depicts a decoy filesystem architecture of this disclosure.

FIG. 3 depicts the basic approach. The filesystem being protected is depicted as base filesystem 300, and this filesystem may be of any conventional type, e.g., block-based, network-based, etc. In this example implementation, the filesystem executes in a computing system 302, such as depicted in FIG. 2. The computer system 302 includes an operating system (OS) kernel 304 (e.g., the Linux kernel) that has support for containers and namespaces, such as previously described. According to this approach, a decoy filesystem 306 is configured between the base filesystem 300 and user space 308 in which processes in the process groups 310 execute. This architecture allows for different directory and file trees to be overlayed (i.e., superimposed) over the base filesystem 300. To this end, a set of filesystem overlays 312 are then preferably deployed on a per-process basis, providing each process with a different view of the filesystem. As also depicted, the degree of trust may vary (e.g., by increasing) across the overlays. Thus, "overlay 2" may be seen as more trusted than "overlay 1," etc.

Figure 4:
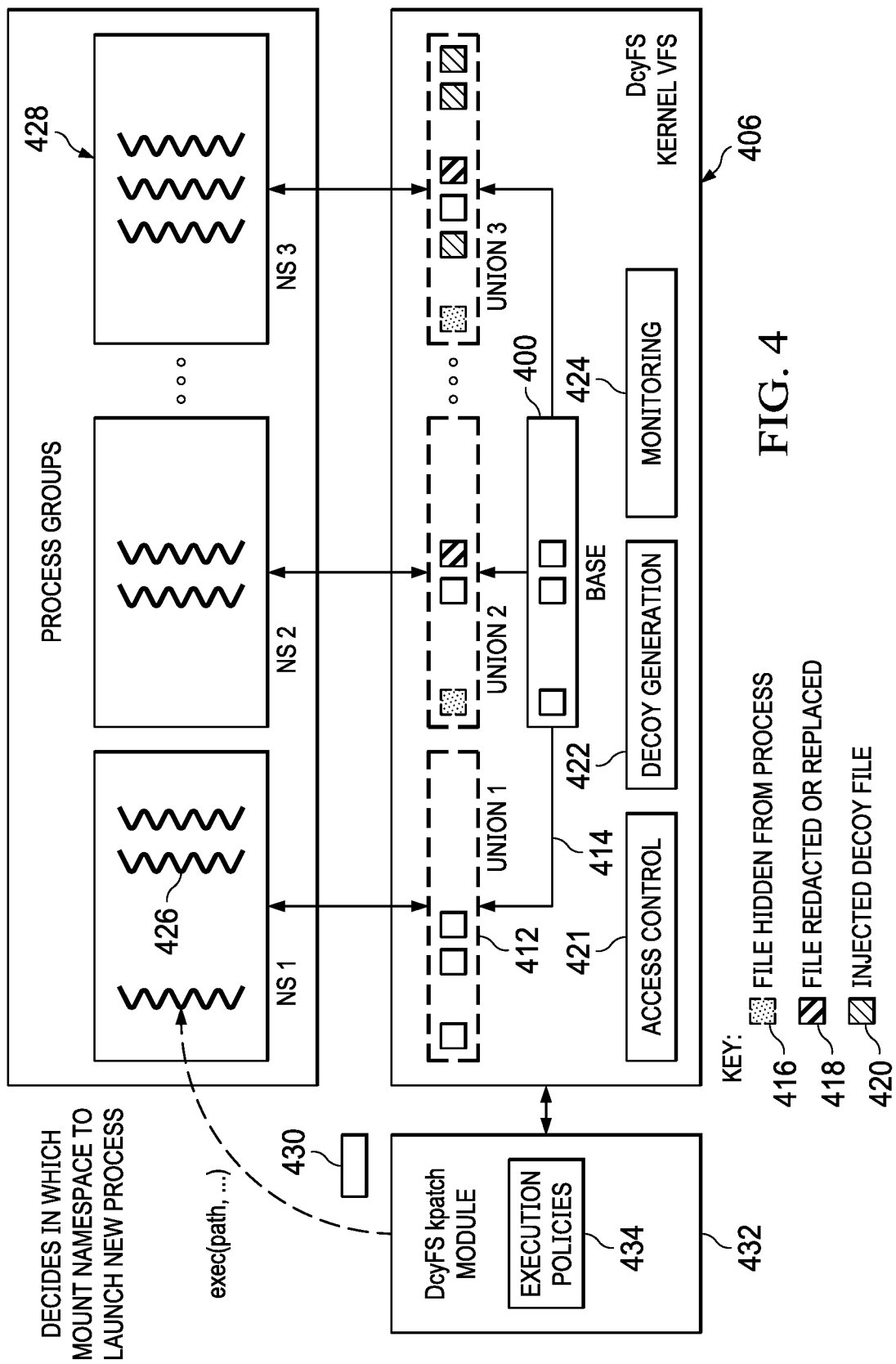
FIG. 4 depicts an implementation of the decoy filesystem using operating system kernel mount namespaces.

FIG. 4 depicts an architectural overview of the decoy filesystem 406 in additional detail. As noted above, the approach configures a set of filesystem overlays 412 that are preferably deployed on a per-process basis, providing each process with a different view of the filesystem. As depicted, the base filesystem 400 is shown as comprising a set of base files 414, and these base files are mirrored in each of the overlays. Within an overlay, however, and as indicated by the key, a base file may be hidden from a process (represented by hidden file 416), or redacted or replaced (represented by replaced file 418). The key also indicates the notion of a decoy file 420 that may be injected into a particular overlay. As depicted, the "view" presented to a process in a particular overlay may vary and is computed as a "union" of the base filesystem 400 and the overlay 412. To alter the resulting union, and as noted, each overlay 412 thus has the ability to (1) hide base files, (2) modify the content of a base file by overlaying a different file (e.g., one that is redacted or replaced) with the same name, and (3) inject new decoy files that are not present in the host system. Further, file writes are stored in the overlay 412, thereby protecting base files 414 from being overwritten. This approach thus provides for a stackable filesystem that can be mounted atop different base filesystem types (e.g., block-, disk-, network-) to offer data integrity protection and enhanced detection against data-stealing attacks.

As also depicted, the decoy filesystem preferably includes an access control module 421, a decoy generation module 422, and a monitoring module 424. The access control module 421 controls access to the overlays 412 by the processes 426, which execute within one or more namespaces 428 configured in user space 408. The namespaces 428 are "mount" namespaces. The decoy generation module 422 generates encrypted files and implants the decoys in the overlay to replace sensitive files in the base filesystem. The monitoring module 424 transparently monitors and logs access to the files. Based on this monitoring, the system can determine whether a process 426 is trusted. Preferably, and then using the access control module 421, only an untrusted process is affected by the hidden and decoy files, leaving legitimate users free of confusion.

To effectively and securely construct filesystem overlays, the decoy filesystem 406 preferably leverages an operating system kernel mount namespace 428 and, in particular, to pivot the base filesystem in the namespace to a specially-crafted union mount. The mount namespace is an operating system construct that provides an isolated mount point list for every process residing in a particular namespace; thus, a process inside the namespace observes a different filesystem than the base system. Processes are moved, upon creation, into a mount namespace, preferably based on some notion of trust. Preferably, a decoy filesystem kernel patch module is used for this purpose. In one embodiment, a simple trust model that may be used for this purpose is based on white/black listing. The trust model maps a user name, binary hash, or process name to a set of configurations describing an overlay. An alternative trust model approach, based on the notion of security domains, is described below.

Referring back to FIG. 4, preferably a configuration also specifies which files and directories to show in the overlay, which ones to hide, and which ones to replace with another file. Using the access control module 421, trusted processes are then presented with a pristine (unaltered) view of the filesystem.

In particular, and too achieve transparency and minimize performance overhead, a preferred Linux-based implementation leverages a kernel modification deployed as a kernel hot patch 430 (patching the kernel while it is running), and the installation of a kernel module 432 implementing the monitoring, access control, and decoy creation and injection capabilities. As depicted in FIG. 4, the hot patch 430 modifies the kernel's exec family of functions 434 to drop newly-created processes into a new mount namespace protected by the decoy filesystem. The particular overlay is chosen based on the trust model, and a preferred trust model is described below. Child processes automatically inherit their parent namespace, unless otherwise specified by the trust model.

Figure 5:
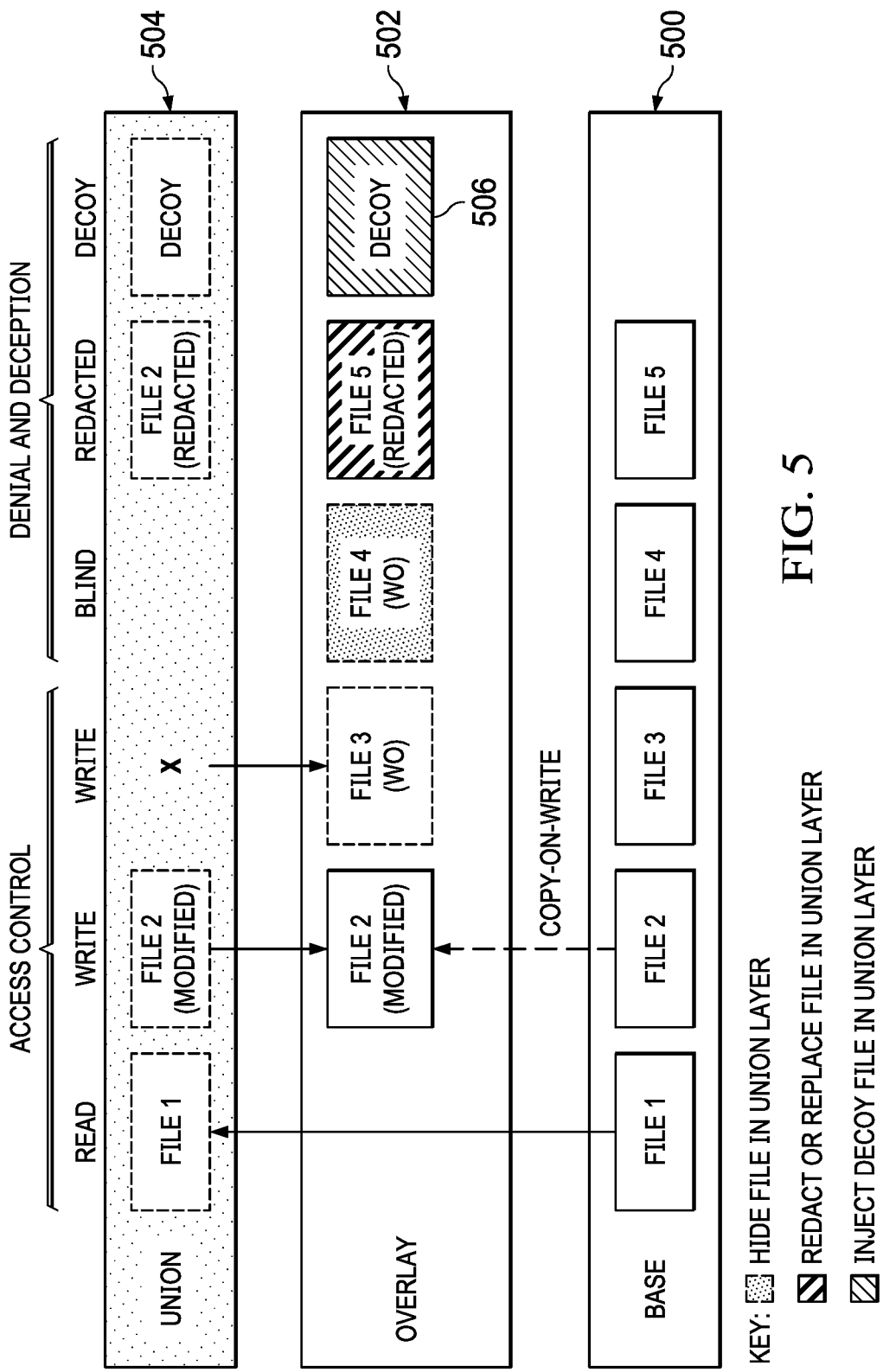
FIG. 5 depicts how the decoy filesystem implements access control, and various denial and deception techniques to protect files in the base filesystem.

Further details of a decoy filesystem implementation are shown in FIG. 5. In this embodiment, the decoy filesystem is implemented using the Linux operating system OverlayFS union filesystem, which creates an upper mount and a lower mount. In this context, the lower mount is the base filesystem, and the upper mount is the overlay. FIG. 5 depicts this concept, showing the base 500 and overlay 502 mounts, and the resulting union 504 of the two mounts that serves as the namespace's pivot. The base filesystem in this example includes a set of base files (file 1 through file 5), and the various protection features provided by the decoy filesystem are shown by of example. Thus, the access control module operation is shown with respect to various read/write operations on base files 1, 2 and 3. Base file 1 is made available in the union for read; base file 2 is stored in the overlay in a modified form such that a write from the union does not impact the base file; and base file 3 is marked as deleted in the overlay so that it cannot be written. The denial and deception function is depicted by example with respect to base files 4 and 5. Thus, base file 4 is hidden in the overlay and thus not available in the union; base file 5 is redacted or replaced in the overlay and thus only made available in the redacted form in the union. An additional decoy file 516 is also provided in the overlay and is thus visible in the union, but this decoy does not correspond to any base file.

Thus, and as these non-limiting examples demonstrate, there are several techniques that are implemented by the decoy filesystem. To hide a base file or directory, the decoy filesystem simply marks it as deleted in the overlay. Decoy files are similarly placed in carefully-chosen locations inside the upper mount, and existing files can be replaced or redacted for attacker deception as previously noted. Changes made by processes determined to be untrusted do not affect the base filesystem, thereby protecting legitimate users from seeing malicious changes as well as effectively keeping an uncorrupted copy of the filesystem immediately before the malicious process started. The decoy filesystem hides particular files and directories from a process, thus curtailing sensitive data leaks. When necessary, the decoy filesystem generates encrypted files and implants decoys in the overlay to replace sensitive files in the base filesystem.

An example Linux implementation uses Ubuntu 16.04 LTS, leveraging VFS (Virtual File System) and its mount namespace implementation. This implementation is advantageous as it provides for a stacking filesystem to augment standard filesystems with the desired denial and deception capabilities (namely, hiding resources from untrusted processes, redacting or replacing assets to protect sensitive data, and injecting breadcrumbs to dis-inform and misdirect attackers). The VFS module enables transparent and easy integration with legacy environments. Further, the filesystem can be easily installed without system restart by using the kernel hot-patch to configure it into the existing production environment. While the above implementation is preferred, it is not intended to be limiting. Recently, Windows Server 2016 was released with native namespace support and an overlay filesystem driver, mirroring its open-source counterpart. The above-described approach may be implemented therein, or other modern operating system environments that support namespace-type constructs.

Figure 6:
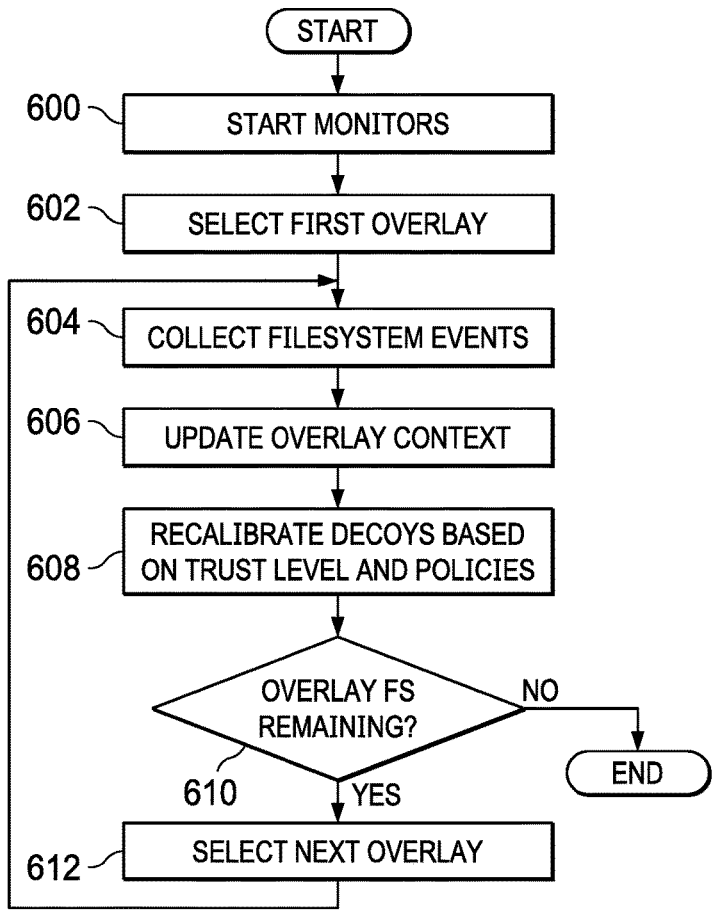
FIG. 6 is a process flow depicting how the decoy filesystem strategically overlays deceptive objects atop the base filesystem.
Figure 7:
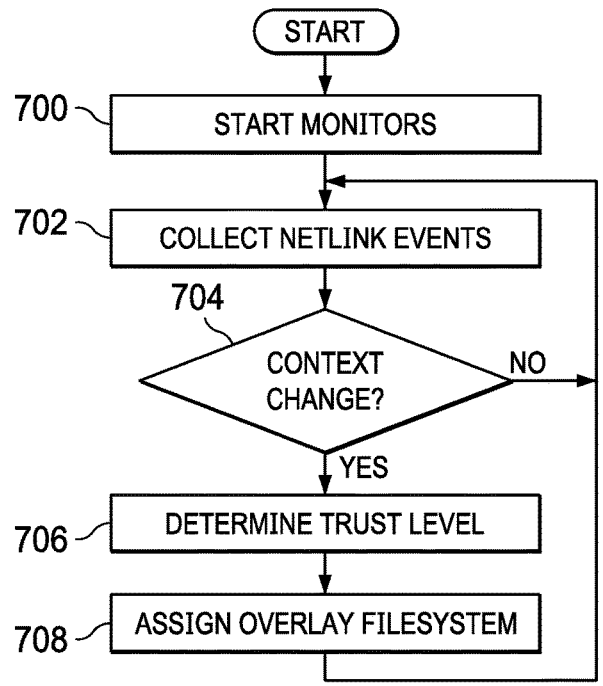
FIG. 7 is a process flow depicting how the decoy filesystem creates a targeted filesystem "view" that is assigned to an overlay.

The various operations of the decoy filesystem may be implemented in software executed in one or more hardware processors, typically as a set of processes. FIGS. 6 and 7 depict several additional control processes that may be used with the system and are now described.

FIG. 6 is a process flow depicting how the decoy filesystem strategically positions deceptive objects (decoys) atop the base filesystem. At step 600, the monitors (one for each overlay) are started. At step 602, a first overlay is selected. Filesystem events are then collected at step 604 for the selected first overlay. At step 606, the routine updates an overlay "context" for the overlay being monitored. At step 608, decoys are then recalibrated (i.e., strategically-positioned) based on the existing trust level and, optionally, one or more policies. At step 610, a test is made to determine whether additional overlays need to be monitored. If so, the routine branches to step 612 to select a next overlay for monitoring. Control then returns to step 604. When all of the overlays have been processed, the outcome of the test at step 610 is negative and the decoy deployment process ends.

"FIG. 7 is a process flow depicting how the decoy filesystem creates targeted filesystem "views," e.g., that hide hide-value resources and expose breadcrumbs to detect deliberate tampering with filesystem data. To this end, the decoy filesystem actively captures filesystem events and correlates them with other system features (e.g., user, process name, time, etc.) to create the views. Thus, the process begins at step 700 by starting the monitors. At step 702, netlink events are collected. The netlink socket family is a Linux kernel interface used for inter-process communication (IPC) between both the kernel and user space processes, and between different user space processes. Using the information collected, a test is performed at step 704 to determine whether a context change has occurred. If not, the routine cycles. If, however, the outcome of the test at step 704 indicates a context change, the routine continues at step 706 to determine the trust level. At step 708, a new "view" is created and assigned to an overlay in the decoy filesystem. In an alternative embodiment, a pre-existing view may be used. Control then returns to step 702 to complete the process."

The stackable filesystem as described above provides data integrity, preferably by strictly enforcing that all writes are made to the overlay layer. Writes to base files are first copied up to the overlay layer before being written using copy-on-write. This has the desirable effect of preserving the base filesystem, such that changes made by untrusted processes do not affect the base, protecting legitimate users from seeing malicious changes as well as effectively keeping a pristine copy of the filesystem immediately before the malicious process started. The stackable filesystem hides particular files and directories from the process, thus curtailing sensitive data leaks. Additionally, the filesystem generates encrypted files and implants decoys in the overlay to shadow sensitive files in the base filesystem. The stackable filesystem also transparently monitors and logs access to such files. Moreover, only the untrusted process is affected by the hidden and decoy files, leaving legitimate users free of confusion.

In summary, and as described above, process isolation is implemented with mount namespaces and an overlay filesystem. The kernel "exec" system call function is patched with an extension to determine in which mount namespace a new process should be moved. The choice of the namespace defines what the process will see going forward. Upon starting a new process (i.e., when the "exec" system call is called by its parent), a policy or other configuration is used to decide whether the process is isolated. A non-isolated process has access to the original (host) file system. An isolated process, however, is moved into a private mount namespace. Then, an overlay is mounted over the filesystem. Sensitive files are removed or overlaid with decoys according to a configuration policy (general system policy and/or specific policy for the given subject/process/application). The process is updated to be running inside the overlay but it is allowed to continue running as normal.

Identification of Forensics Indicators of Compromise Using Subject-Specific Filesystem Views The stackable filesystem architecture as has been described offers a valuable tool for post-mortem filesystem forensics. In particular, the overlay records all created, modified, and deleted files during the execution of an untrusted process. Such a record provides information that is or can be important in piecing together the evidence of an attack. To this end, this portion of the disclosure describes a technique to facilitate such forensic investigations, and to enable the system to react seamlessly and efficiently when for example one or more indicators of compromise are detected.

Figure 8:
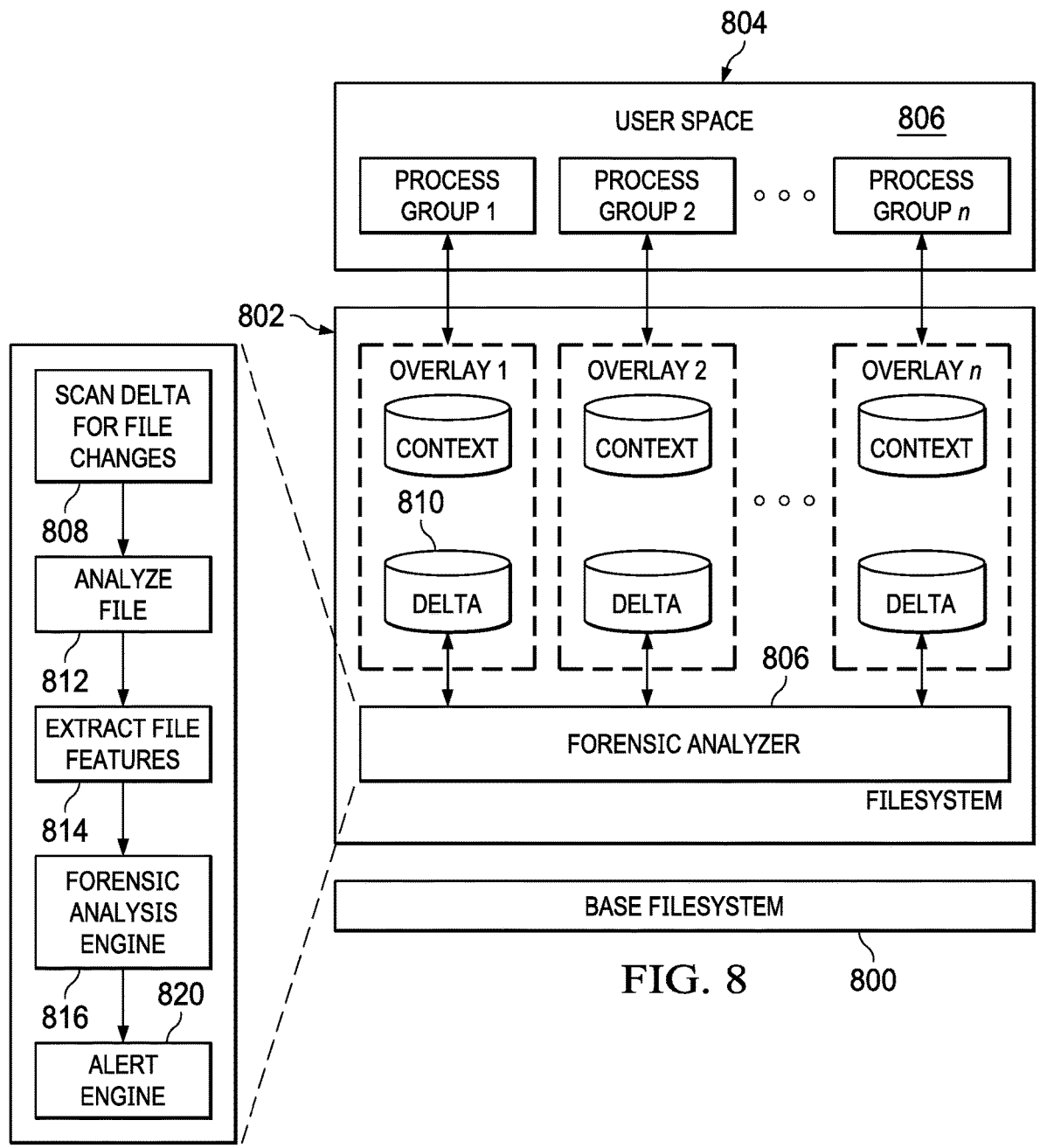
FIG. 8 depicts how the stacked filesystem of this disclosure is augmented to include or be associated with a forensic analyzer that provides forensic analysis.

FIG. 8 depicts a stackable filesystem that transparently tracks process file writes for forensic analysis according to this disclosure. As depicted, and as described above, the filesystem comprises a base filesystem 800, and an overlay filesystem 802. Processes executing in one or more process groups 804 in the user space 806 see the union of the upper and lower filesystems, but as described above process writes are only reflected in the overlay 802. By providing per-process (or per-process group) views of the filesystem using this stackable approach, a forensic analyzer 806 is then utilized to record and analyze file-based activity, such as file creation, file deletion, file modification, and so forth, for a particular process (or a process group). The stackable filesystem thus maintains file integrity and confidentiality against untrusted subjects, while luring attackers into accessing decoys and leaving forensic trails on the filesystem that can then be detected and analyzed by the forensic analyzer 806. As noted, the system achieves these goals by creating customized views of the underlying filesystem, preferably on a per-subject basis. As will be seen, the technique herein leverages the insight that legitimate subjects only require access to directories, files, and file types relevant to their work, and they do not need to know about other files on the system. Thus, when the forensic analyzer 806 identifies such access by the untrusted subject, relevant indicators of compromise can be identified and extracted, and then acted upon to protect the filesystem.

As also depicted, the forensic analyzer 806 comprises several functions or operations. These functions are identified separately, but this is not a requirement, as one or more of the functions/operations may be combined. Typically, the forensic analyzer executes as software (namely, as a set of computer program instructions executed in one or more processors). The operations begin at step 808, wherein the analyzer scans a delta 810 in each overlay to identify file changes. At step 812, any file that has been identified as being changed (e.g., since a most recent scan) is analyzed. To this end, file features are extracted at step 814, and these features are then supplied to a forensic analysis engine 816 for analysis. The file features in particular are analyzed to identify indicators of compromise (IoCs), and these indicators are then input into the forensics analysis engine 816. The engine 816 is operative to quickly decide whether a subject (e.g., a process, a user, etc.) that is accessing the filesystem via a process is malicious. If the subject is determined by the engine 816 to be malicious, preferably the forensic analyzer takes some proactive action to address the attack. Thus, for example, the forensic analyzer may include an alert engine 820 that issues an alert or notification. The alert engine may comprise part of the forensic analyzer, or it may be implemented as a component of some other system. In addition to alerting, upon detecting an attack, the system may carry out other responses, such as quarantining the potential attack, blocking the request, or the like.

In one embodiment, and as shown in FIG. 8, the forensic analyzer 806 is a separate process, although in an alternative embodiment the analyzer (or components thereof) is integrated into the filesystem directly. In the embodiment described above, the analyzer uses operation 808 to actively scan the filesystem; in the alternative, the analyzer is notified of file changes by the filesystem. In the preferred approach, the analyzer polls for changes at particular intervals. As noted, when changes are identified, the analyzer first extracts a set of features that are potential indicators of compromise, and then it feeds those features into an appropriate classifier within the forensic analysis engine. One or more forensic classifiers implemented in the forensic analysis engine are machine learning-based, rule-based, or some combination thereof. Once a classifier in the forensic analysis engines renders a decision (typically whether a subject is or might be malicious), an appropriate response by the analyzer (or systems that support the analyzer) is formulated. This response may be varied and include, for example, issuing an alert, taking an action to halt or quarantine the machine or some portion of the filesystem, reassigning trust dynamically (e.g., potentially hiding important files), injecting new deceptions to identify what the attacker wants or to confirm that the software indeed is malicious, gather and share threat intelligence (such as malware/exploit payloads) and use that intelligence to identify other infected machines on the network, and so forth.

In another embodiment, the forensic analyzer is embedded as a module directly into the overlay filesystem. In this embodiment, forensic analysis is performed after certain file-based events take place. Typically, these events include file close, write, and deletes. In this embodiment, the analyzer does not intercept the file writes, but rather it performs its analysis on the file after the file is written to the overlay. Embedding the forensic analyzer directly into the overlay filesystem enables the analyzer to be more responsive to activities on the filesystem.

Thus, the filesystem-aided forensics approach of this disclosure takes advantage of overlays based on filesystems, and per-process or per-process group views of the filesystem. After creating an overlay view, all file writes to that view become an imprint of a process's file write activity. As a result, the system can analyze the overlay as a whole and extract indicators of compromise (IOCs), as has been described. In operation, the system preferably analyzes entire files written to the overlay to determine if they are exhibiting malicious behaviors, although this is not a requirement.

The following section describes representative key indicators of compromise (IOCs) that the stackable filesystem helps to uncover when performing forensic investigations. These indicators are sourced from the ATT&CK for Enterprise threat model, and they have been verified through experiments with Linux malware samples. Using these IoCs, the forensic analyzer (and, in particular, the forensic analysis engine) is trained to identify malicious patterns on the filesystem. FIG. 10 describes each indicator of compromise along with the list of features the forensic analyzer uses to identify malicious activity (e.g., a modified file on the system), as well as a set of example malware that incorporates such techniques. The following describes these entries in more detail.

Persistence.

One of the key goals for any malware is to maintain its presence across system reboots. The exact mechanism for persistence is dependent on whether the malware has root privileges. If it does not, the malware will modify its user's bash profile (e.g., modifying .bash_profile, .profile, or .bashrc files) adding a reference to the malicious application. As a result, when a shell is activated by the user, the malware is launched in the background. Malware running with escalated privileges often modify system-wide configurations in order to persist. This is achieved by dropping initialization scripts into the system run-level directories (e.g., /etc/rc[0-6].d), or by modifying the /etc/rc.local to add a malicious script. In fact, some malware even installs a modified /sbin/init file to launch itself on system startup.

Account Manipulation.

Malware, such as backdoors and remote access terminals, create accounts in order to authenticate to systems, escalate privileges, and evade defenses. This requires modifications to the /etc/passwd and /etc/shadow files, which store username and password information.

Scheduled Tasks.

Additionally, malware can ensure persistence and evade detection by creating reoccurring tasks that run at strange hours. On Linux, these tasks are configured through a crontab, and malware will install crontab scripts (e.g., in/etc/cron.d), or by editing the /etc/crontab system file.

Library Injection.

Some malware, like Umbreon and Jynx2, are not executables, but rather libraries designed to be preloaded by system processes. The libraries replace libc API calls in order to change the functionality of a running application. In this way, an Apache web server can be turned into a backdoor, or a Bash shell can be hijacked into mining bitcoins in the background. To inject themselves into system applications, malware can add a preload entry into/etc/ld.so.preload. This enforces that the malware library will be loaded before all others.

Binary Drop.

Cybercrime is becoming a commodity business, where large criminal syndicates rent access to large botnets to other attackers. These bots are designed to download various pieces of malware, such as bitcoin miners or key loggers, to be monetized by the syndicate. With root access, bots will try to download malware in all bin directories in hopes the defender will miss one when detected. As a result, newly installed binary downloads on a filesystem are a key indicator of compromise, and our Forensic Analyzer searches for downloaded ELF files.

Binary Modifications & Deletions.

Aside from downloading new binaries, malware can also alter existing system binaries to make them secretly engage in nefarious activities. For example, when a user runs/bin/ls, the application could exfiltrate all files in the directory without the user's knowledge.

Hidden Evidence.

Typically, skilled attackers will try to cover their tracks in order to evade detection. One way to do so is by hiding malware through hidden files, such as any file starting with a period, or modifying programs such as/bin/ls so that malware files are ignored when the contents of a directory are displayed to a user. Another technique for hiding one's presence is to remove entries from the bash history (e.g., .bash_history), or deleting crontab entries that conduct anti-virus scans. Finally, killing or deleting anti-virus software is another mechanism for ensuring that malicious activities are not uncovered.

File Defacement.

Recent ransomware attacks capitalize on encryption as the main technique to hold their victims' data for ransom. Such attacks often consist in replacing existing files with their encrypted counterparts generated by the ransomware. Our forensic analysis looks for indication of encryption in the overlay filesystem (such as file mimetype) to find evidence of file defacement.

Information Measurement.

Attacks can also be characterized by measuring their information footprint in the filesystem. Our forensics analyzer generates three indicators that estimate the impact of filesystem changes introduced by programs: Binary differences: average percentage of modified bytes across copied up files. Information gain: average information gain across copied up files, measured as the difference between the entropies of base and overlay files. Write entropy: average write entropy across overlay files.

Many of the above IOCs are identified by malware writing to specific system init or configurations that are important to the OS operation, and to which no malware application should be accessing. Typically, these files appear on the overlay after a write, making them easy to identify by the forensic analyzer. Further, because the original system files also appear on the base filesystem, changes to the file are easily extracted.

For calculating write entropy (when determining whether a file has been encrypted), the overlay enables calculation of the difference in Shannon entropy between the original and the file on the overlay. Large entropy differences indicate that a file has likely been encrypted.

The above list of indicators of compromise is specific to Linux OS malware, and thus it should not be taken to limit the scope of this disclosure. Indeed, there is no requirement that the forensic analyzer implement any specific forensic analysis mechanism or algorithm. Rather, the notion here is to provide a general forensic analysis framework that leverages the stackable filesystem architecture in the manner described. Further, the nature and details regarding the IoCs are also merely representative.

The approach as described herein is advantageous as it enables forensic analysis without requiring file access mediation, and without conducting system event-level collection and analysis, making the approach a lightweight, and non-intrusive solution. In this regard, the approach herein assumes a threat model wherein attackers interact with the filesystem, e.g., to perform reconnaissance, steal data, and sabotage their victim's files. It is also assumed that malicious subjects might attempt to erase story-telling traces of compromise from the filesystem. Nevertheless, the notion of misleading the attacker into interacting with an isolated overlay is therefore quite useful for detecting and characterizing the attack, and divulging attacker strategies and goals not discernible from a monolithic filesystem. Attacker actions typically are processed with root- or user-level privileges. The approach herein enables the defender to deflect attackers to isolated, deceptive views of the filesystem (namely, the overlays), to thereby enable the forensic analyzer (or other supporting systems) to perform information gathering and forensic investigation.

A security goal of this architecture is to provide for integrity, which refers to the infeasibility of alteration of file contents or deletion of files in the underlying filesystem by a subject. More concretely, after the stackable filesystem is initialized, attackers freely interact with their filesystem views, reading, modifying, and deleting filesystem objects. As noted above, the stackable filesystem then enforces file integrity by design, as any writes to base files are first copied up to the overlay layer before modifications take place. This enables the filesystem to resist data corruption and destruction attacks, and it also forms the basis for creating efficient recovery strategies. Another security goal is confidentiality, which refers to the infeasibility of an attacker to learn any information about files stored in the base filesystem other than files explicitly allowed into the subject's view (e.g., via bind mount operations). To prevent data theft and sensitive information leakage, the stackable filesystem implements special operators that declassify the filesystem views purveyed to untrusted subjects: blind conceals the existence of a file to the upper layer, and redact replaces sensitive (classified) file contents or an entire file all together in the subject's view. Similarly, to deceive and disinform attackers, the system introduces a facility to seamlessly inject decoy files and baits into untrusted filessytem views. This affords the filesystem the capability of denying visibility of legitimate files while luring untrusted subjects into revealing their intent and strategies.

The forensic analyzer may be implemented as program code (e.g., written in C and tested on Linux Ubuntu 16.04 with kernel 4.10.0-27-generic). To achieve transparency and minimize performance overhead, the decoy filesystem preferably implements a small modification to the kernel along with the installation of a kernel module, which implements monitoring, mount isolation, decoy creation and injection capabilities. The kernel modification preferably is deployed as a kernel hot-patch (patching the kernel while it is running) using kpatch, which modifies the kernel's exec family of functions to drop newly-created processes into a new mount namespace protected by the union filesystem. Alternatively, the filesystem may be launched at operating system bootstrap time as a built-in kernel module or Linux Security Module (in the case of Linux). Linux's OverlayFS union filesystem may be used to implement the stackable filesystem.

The subject matter herein provides other significant advantages. As described, the approach herein provides a stackable filesystem architecture that curtails data theft and ensures file integrity protection, preferably by grouping applications into ranked filesystem views (namely, the security domains). By combining its layered architecture with view separation, the filesystem maintains data integrity and confidentiality and enables filesystem-aided forensics without affecting how the underlying filesystem is used. The filesystem also stops malware from making system-level changes, such as persisting across reboots or creating hidden users, regardless of privilege. The techniques herein are simple to implement.

The techniques herein provide additional advantages of enabling transparent access to the filesystem while ensuring data integrity and confidentiality, non-disruption of normal use of the filesystem, and no additional read or write overheads.

The decoy filesystem technique stops theft, prevents modification or destruction of important data by untrusted subjects, (e.g., applications, users, etc.), deceives adversaries, and detects the presence of attackers on production systems using filesystem-aided forensics. It provides for a new filesystem paradigm that protects files effectively at their place of rest. The solution provides a decoy filesystem that monitors file accesses transparently, hides sensitive data, creates decoy files, and modifies existing files to provide to untrusted subjects (e.g., processes and users) a fake system view. The filesystem actively captures filesystem events and correlates them with other system features (e.g., user, process name, time) to create targeted filesystem views that hide high-value assets and expose enticing breadcrumbs to detect deliberate tampering with filesystem data. Such context-awareness minimizes false alarms by curtailing inadvertent, legitimate access to breadcrumbs, by exposing more "truthful" views of the filesystem to trustworthy processes, all the while maximizing chances of forensic-based attack detection by strategically overlaying deceptive objects atop the base filesystem.

The approach detects and resists real ransomware attacks, and it defends against data theft and filesystem tampering without incurring significant overhead. The approach enforces file integrity protection without requiring file access mediation. It also supports the implementation of access control policies, and it enables the automation of decoy injection in commodity filesystems.

In addition, the approach enables the construction of realistic, but completely false, views of the filesystem to be presented to untrusted processes. To a process running in an overlay, it appears that it is able to view, extract, and modify real data. It may be viewing decoy files or missing sensitive files, however, and its file modifications will not be seen outside its overlay. As has been described, this operation is done transparently, without advertising itself to the untrusted process, and without affecting other legitimate processes. Further, and to make decoy files both less visible to trusted users and more visible to attackers, the decoy filesystem actively moves decoys into place for untrusted programs. This means that decoys can be stored out of the way of trusted users (e.g., in a hidden directory), as well as being visible in normal locations for untrusted programs.

Preferably, and as described above, the changes made by untrusted processes are currently only visible to that process and disappear on reboot, although this is not a requirement. System initialization scripts, however, never see the overlay, so any writes to the overlay do not affect the OS on a reboot. In situations where an untrusted process should become trusted, such as being vouched for by a more-trusted subject, those changes may be copied from the overlay and merged into the real filesystem. Further, the approach herein supports decoy files that are created manually. As another variant, the decoy filesystem may create decoy files automatically based on different formats, such as data that appears to be encrypted, or files containing fake keys or passwords. The system may also be configured to learn the content of overlays based on past process behaviors to streamline overlay generation.

As has been described, the approach herein preferably is implemented as an overlay to an existing filesystem, and thus there is no need to have access to the actual filesystem itself. As noted, the technique instead leverages the notion of a filesystem namespace to implement the decoy filesystem, and these types of namespaces are available in modern operating systems such as Linux, Windows Server 2016, and the like. Further, by using a kernel module to hook in and make decisions on where (i.e., which namespace) to place a newly-forked process (e.g., based on trust), the approach may be used with any such operating system, even without access to the actual operating system source code.

The techniques herein may be used with a host machine such as shown in FIG. 2 (or set of machines, e.g., running a cluster) operating in a standalone manner, or in a networking environment such as a cloud computing environment. Cloud computing is an information technology (IT) delivery model by which shared resources, software and information are provided over the Internet to computers and other devices on-demand. With this approach, an application instance is hosted and made available from Internet-based resources that are accessible through a conventional Web browser or mobile application over HTTP. Cloud compute resources are typically housed in large server farms that run one or more network applications, typically using a virtualized architecture wherein applications run inside virtual servers, or so-called "virtual machines" (VMs), that are mapped onto physical servers in a data center facility. The virtual machines typically run on top of a hypervisor, which is a control program that allocates physical resources to the virtual machines.

As previously noted, the above-described components typically are each implemented as software, i.e., as a set of computer program instructions executed in one or more hardware processors. As has been described, the components are shown as distinct, but as noted this is not a requirement, as the components may also be integrated with one another in whole or in part. One or more of the components may execute in a dedicated location, or remote from one another. One or more of the components may have sub-components that execute together to provide the functionality. There is no requirement that particular functions be executed by a particular component as named above, as the functionality herein (or any aspect thereof) may be implemented in other or systems.

The approach may be implemented by any service provider that operates the above-described infrastructure. It may be available as a managed service, e.g., provided by a cloud service.

The components may implement any process flow (or operations thereof) synchronously or asynchronously, continuously and/or periodically.

The approach may be integrated with other enterprise- or network-based security methods and systems, such as in a STEM, or the like.

The functionality described in this disclosure may be implemented in whole or in part as a standalone approach, e.g., a software-based function executed by a hardware processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

Aspects of this disclosure may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the identity context-based access control functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the system is implemented in a special purpose computer, preferably in software executed by one or more processors. The software is maintained in one or more data stores or memories associated with the one or more processors, and the software may be implemented as one or more computer programs. Collectively, this special-purpose hardware and software comprises the functionality described above.

While a process flow above describes a particular order of operations performed by certain embodiments, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

The nomenclature used herein also should not be taken to be limiting.

The techniques improve conventional computing systems by providing a filesystem that curtails data theft and ensures file integrity protection through deception. Existing computing technologies are improved by providing a decoy filesystem that monitors file accesses transparently, hides sensitive data, creates decoy files, and modifies existing files to provide to untrusted subjects (e.g., processes and users) a fake system view. Computing systems that incorporate the techniques herein provide these advantages transparently and without disruption, thereby increasing the reliability and availability of the underlying filesystem. Further, computer systems implemented with the approach herein operate more efficiently and with less cyber security-specific processing and storage requirements than they would otherwise.

Having described the invention, what we claim is as follows:

1. A method of forensic analysis in a filesystem comprising filesystem overlays deployed on top of a writable base filesystem, comprising:
    associating a particular filesystem overlay with a subject;
    as the subject performs file-based activity in the particular filesystem overlay, capturing information indicative of the file-based activity;
    analyzing the captured information to determine whether the subject associated with the file-based activity is malicious; and
    upon a determination that the subject associated with the file-based activity is malicious, taking a predetermined action to protect the filesystem.

2. The method as described in claim 1 wherein the file-based activity is one of: creation of a file, deletion of a file, and modification of a file.

3. The method as described in claim 1 wherein analyzing the captured information includes, for a given file, determining whether the given file has been modified as a result of the file-based activity.

4. The method as described in claim 3 further including extracting file features from the given file upon a determination that the given file has been modified as a result of the file-based activity.

5. The method as described in claim 4 further including using the file features extracted to identify one or more indicators of compromise.

6. The method as described in claim 5 further including determining whether the subject associated with the file-based activity is malicious based on the one or more indicators of compromise.

7. The method as described in claim 6 wherein the predetermined action to protect the filesystem is one of: issuing an alert, blocking additional file-based activity associated with the subject, quarantining the suspect, reassigning trust dynamically to hide certain files, injecting one or more new deceptions, and gathering and sharing threat intelligence.

8. An apparatus, comprising:
a processor;
computer memory holding computer program instructions executed by the processor, the computer program instructions configured to provide forensic analysis in a filesystem comprising filesystem overlays deployed on top of a writable base filesystem, the computer program instructions comprising program code configured to:
associate a particular filesystem overlay with a subject;
as the subject performs file-based activity in the particular filesystem overlay, capture information indicative of the file-based activity;
analyze the captured information to determine whether the subject associated with the file-based activity is malicious; and
upon a determination that the subject associated with the file-based activity is malicious, take a predetermined action to protect the filesystem.

9. The apparatus as described in claim 8 wherein the file-based activity is one of: creation of a file, deletion of a file, and modification of a file.

10. The apparatus as described in claim 8 wherein the program code configured to analyze the captured information includes, for a given file, program code configured to determine whether the given file has been modified as a result of the file-based activity.

11. The apparatus as described in claim 10 wherein the program code configured to analyze further includes program code configured to extract file features from the given file upon a determination that the given file has been modified as a result of the file-based activity.

12. The apparatus as described in claim 11 wherein the program code configured to analyze further includes program code configured to use the file features extracted to identify one or more indicators of compromise.

13. The apparatus as described in claim 12 wherein the program code configured to analyze further includes program code configured to determine whether the subject associated with the file-based activity is malicious based on the one or more indicators of compromise.

14. The apparatus as described in claim 13 wherein the predetermined action to protect the filesystem is one of: issuing an alert, blocking additional file-based activity associated with the subject, quarantining the suspect, reassigning trust dynamically to hide certain files, injecting one or more new deceptions, and gathering and sharing threat intelligence.

15. A computer program product in a non-transitory computer readable medium, the computer program product holding computer program instructions to provide forensic analysis in a filesystem comprising filesystem overlays deployed on top of a writable base filesystem, the computer program instructions comprising program code configured to:
associate a particular filesystem overlay with a subject;
as the subject performs file-based activity in the particular filesystem overlay, capture information indicative of the file-based activity;
analyze the captured information to determine whether the subject associated with the file-based activity is malicious; and
upon a determination that the subject associated with the file-based activity is malicious, take a predetermined action to protect the filesystem.

16. The computer program product as described in claim 15 wherein the file-based activity is one of: creation of a file, deletion of a file, and modification of a file.

17. The computer program product as described in claim 15 wherein the program code configured to analyze the captured information includes, for a given file, program code configured to determine whether the given file has been modified as a result of the file-based activity.

18. The computer program product as described in claim 17 wherein the program code configured to analyze further includes program code configured to extract file features from the given file upon a determination that the given file has been modified as a result of the file-based activity.

19. The computer program product as described in claim 18 wherein the program code configured to analyze further includes program code configured to use the file features extracted to identify one or more indicators of compromise.

20. The computer program product as described in claim 19 wherein the program code configured to analyze further includes program code configured to determine whether the subject associated with the file-based activity is malicious based on the one or more indicators of compromise.

21. The computer program product as described in claim 20 wherein the predetermined action to protect the filesystem is one of: issuing an alert, blocking additional file-based activity associated with the subject, quarantining the suspect, reassigning trust dynamically to hide certain files, injecting one or more new deceptions, and gathering and sharing threat intelligence.

* * * * *